United States Patent
Yoshikawa et al.

(10) Patent No.: US 9,893,353 B2
(45) Date of Patent: Feb. 13, 2018

(54) NEGATIVE ELECTRODE MATERIAL FOR NONAQUEOUS ELECTROLYTE SECONDARY BATTERIES, AND SECONDARY BATTERY

(71) Applicant: SHIN-ETSU CHEMICAL CO., LTD., Tokyo (JP)

(72) Inventors: Hiroki Yoshikawa, Annaka (JP); Masahiro Furuya, Annaka (JP); Hiromichi Kamo, Annaka (JP); Kohta Takahashi, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 0 days.

(21) Appl. No.: 14/888,907

(22) PCT Filed: Apr. 28, 2014

(86) PCT No.: PCT/JP2014/061835
§ 371 (c)(1),
(2) Date: Nov. 3, 2015

(87) PCT Pub. No.: WO2014/188851
PCT Pub. Date: Nov. 27, 2014

(65) Prior Publication Data
US 2016/0087270 A1    Mar. 24, 2016

(30) Foreign Application Priority Data

May 23, 2013    (JP) .................................. 2013-109050

(51) Int. Cl.
*H01M 4/134*    (2010.01)
*H01M 4/38*    (2006.01)
(Continued)

(52) U.S. Cl.
CPC ........... *H01M 4/386* (2013.01); *H01M 4/364* (2013.01); *H01M 4/382* (2013.01); *H01M 4/48* (2013.01);
(Continued)

(58) Field of Classification Search
CPC ....... H01M 4/131; H01M 4/386; H01M 4/134
See application file for complete search history.

(56) References Cited

U.S. PATENT DOCUMENTS 5,401,599 A    3/1995  Tahara et al.
5,478,671 A    12/1995 Idota
(Continued)

FOREIGN PATENT DOCUMENTS

JP    5-174818 A    7/1993
JP    6-60867 A    3/1994
(Continued)

OTHER PUBLICATIONS

International Search Report, issued in PCT/JP2014/061835, dated Aug. 12, 2014.
(Continued)

*Primary Examiner* — Olatunji Godo
(74) *Attorney, Agent, or Firm* — Birch, Stewart, Kolasch & Birch, LLP (57) ABSTRACT

The present invention relates to a negative electrode material for nonaqueous electrolyte secondary batteries, which is composed of a silicon composite body that has a structure wherein microcrystals or fine particles of silicon are dispersed in a substance having a composition different from that of the microcrystals or fine particles, said silicon composite body having a crystallite size of the microcrystals or fine particles of 8.0 nm or less as calculated using Scherrer's equation on the basis of the half width of the diffraction peak belonging to Si(220) in an X-ray diffraction. The present (Continued)

invention is able to provide a negative electrode material for nonaqueous electrolyte secondary batteries, which has excellent coulombic efficiency, and a nonaqueous electrolyte secondary battery.

1 Claim, 2 Drawing Sheets

(51) Int. Cl.
*H01M 4/36* (2006.01)
*H01M 4/48* (2010.01)
*H01M 4/62* (2006.01)
*H01M 10/0525* (2010.01)
*H01M 4/485* (2010.01)
*H01M 10/052* (2010.01)

(52) U.S. Cl.
CPC .......... *H01M 4/483* (2013.01); *H01M 4/485* (2013.01); *H01M 4/625* (2013.01); *H01M 10/0525* (2013.01); *H01M 4/366* (2013.01); *H01M 10/052* (2013.01); *H01M 2220/30* (2013.01)

(56) References Cited

U.S. PATENT DOCUMENTS

| | | | |
|---|---|---|---|
| 6,066,414 A | 5/2000 | Imoto et al. | |
| 7,037,581 B2 | 5/2006 | Aramata et al. | |
| 2001/0012503 A1 | 8/2001 | Fukuoka et al. | |
| 2003/0118905 A1 | 6/2003 | Fukuoka et al. | |
| 2004/0115535 A1* | 6/2004 | Morita | H01M 4/364 429/231.8 |
| 2011/0244333 A1* | 10/2011 | Kawada | H01M 4/131 429/231.8 |
| 2016/0079591 A1 | 3/2016 | Yang et al. | |

FOREIGN PATENT DOCUMENTS

| | | |
|---|---|---|
| JP | 10-294112 A | 11/1998 |
| JP | 11-102705 A | 4/1999 |
| JP | 2997741 B2 | 1/2000 |
| JP | 2004-63433 A | 2/2004 |
| JP | 3865033 B2 | 1/2007 |
| JP | 3952180 B2 | 8/2007 |
| JP | 2007-294423 A | 11/2007 |
| JP | 4081676 B2 | 4/2008 |
| JP | 2013-8696 A | 1/2013 |
| JP | 105409035 A | 3/2016 |

OTHER PUBLICATIONS

Written Opinion of the International Searching Authority, issued in PCT/JP2014/061835, dated Aug. 12, 2014.
Office Action and Search Report issued in the corresponding Chinese Patent Application No. 201480029539.8 dated Feb. 27, 2017.

* cited by examiner

NEGATIVE ELECTRODE MATERIAL FOR NONAQUEOUS ELECTROLYTE SECONDARY BATTERIES, AND SECONDARY BATTERY

TECHNICAL FIELD

This invention relates to a negative electrode material for nonaqueous electrolyte secondary batteries comprising a silicon composite which is useful as a negative electrode active material for lithium ion secondary batteries, and a nonaqueous electrolyte secondary battery.

BACKGROUND ART

With the recent rapid progress of portable electronic equipment and communication equipment, secondary batteries having a high energy density are strongly desired from the standpoints of economy and size and weight reduction. Prior art known attempts for increasing the capacity of such secondary batteries include the use as the negative electrode material of oxides of V, Si, B, Zr, Sn or the like or compound oxides thereof (for example, Patent Document 1: JP-A H05-174818, Patent Document 2: JP-A H06-60867), melt quenched metal oxides (for example, Patent Document 3: JP-A H10-294112), silicon oxide (for example, Patent Document 4: JP 2997741), and $Si_2N_2O$ or $Ge_2N_2O$ (for example, Patent Document 5: JP-A H11-102705).

These prior art methods are successful in increasing the charge/discharge capacity and the energy density of secondary batteries, but fall short of the market demand partly because of insufficient cycle performance and are still unsatisfactory. A further improvement in energy density is desired.

More particularly, Patent Document 4: JP 2997741 describes a high capacity electrode using silicon oxide as the negative electrode material in a lithium ion secondary cell. Because of an increased irreversible capacity on the first charge/discharge cycle and a practically unacceptable level of cycle performance, there is still left room for improvement. Thus Patent Document 6: JP 3952180 and Patent Document 7: JP 4081676 propose improvements in first cycle efficiency and cycle performance. On the other hand, when secondary batteries are used in electric vehicles, the key factor is a high energy efficiency. Specifically, the important task is an improvement in coulomb efficiency (discharge electric quantity/charge electric quantity) which is a ratio of the quantity of electricity removed from a battery during discharge (discharge electric quantity) to the quantity of electricity needed during charging (charge electric quantity).

PRIOR ART DOCUMENTS

Patent Documents

Patent Document 1: JP-A H05-174818
Patent Document 2: JP-A H06-60867
Patent Document 3: JP-A H10-294112
Patent Document 4: JP 2997741
Patent Document 5: JP-A H11-102705
Patent Document 6: JP 3952180
Patent Document 7: JP 4081676

SUMMARY OF THE INVENTION

Problems to be Solved by the Invention

At the present, it is very important to develop an electrode material having a high charge/discharge capacity. Under the circumstances, silicon and silicon oxide (SiOx) gain a great interest as the negative electrode active material for lithium ion secondary batteries because of their high capacity. Especially, silicon oxide (SiOx) is likely to form silicon microparticles in silicon dioxide as compared with metallic silicon powder, and easy to improve various properties such as cycle performance by micronization of silicon, with an attention being paid thereto. However, the relationship of the size of silicon particles to coulomb efficiency remains indefinite. It is not well known how to obtain a negative electrode material and a secondary battery having an improved coulomb efficiency.

Means for Solving the Problems

As discussed above, silicon based materials including silicon and silicon oxide (SiOx) seem promising as the negative electrode material (active material) for lithium ion secondary batteries, because their charge/discharge capacity is several times greater than the capacity of graphite based materials which constitute the current mainstream. By contrast, a lowering of their coulomb efficiency by repeated charge/discharge cycles becomes bottleneck. Regarding the cause for a lowering of coulomb efficiency by repeated charge/discharge cycles, the inventors made an investigation on the fundamental structure of silicon based material. It has been found that coulomb efficiency can be improved when a silicon based material is structured such that microcrystals or microparticles of silicon are dispersed in a substance of a different composition from the microcrystals or microparticles, typically silicon dioxide, and the microcrystals or microparticles have a crystallite size of up to 8.0 nm. The present invention is predicated on this finding.

Thus the present invention provides the following.

[1] A negative electrode material for nonaqueous electrolyte secondary batteries, comprising a silicon composite structured such that microcrystals or microparticles of silicon are dispersed in a substance of a different composition from the microcrystals or microparticles, the microcrystals or microparticles having a crystallite size of up to 8.0 nm as determined by the Scherrer equation on the basis of the half width of a diffraction peak assigned to Si(220) on X-ray diffractometry.

[2] The negative electrode material for nonaqueous electrolyte secondary batteries of [1] wherein the substance of a different composition from the microcrystals or microparticles is a silicon based compound.

[3] The negative electrode material for nonaqueous electrolyte secondary batteries of [1] or [2] wherein the silicon based compound is silicon dioxide.

[4] The negative electrode material for nonaqueous electrolyte secondary batteries of [1], [2] or [3] wherein the silicon composite is a silicon oxide having the general formula: SiOx wherein x is 0.9≤x<1.6.

[5] The negative electrode material for nonaqueous electrolyte secondary batteries of any one of [1] to [4] wherein the silicon composite has a coating of electroconductive substance on its surface.

[6] The negative electrode material for nonaqueous electrolyte secondary batteries of any one of [1] to [5] wherein the coating of electroconductive substance is a carbon based coating.

[7] The negative electrode material for nonaqueous electrolyte secondary batteries of any one of [1] to [6] wherein the silicon composite further contains lithium.

[8] A nonaqueous electrolyte secondary battery comprising a positive electrode capable of absorption and desorption of lithium ions, a negative electrode, and a nonaqueous electrolyte wherein the negative electrode comprises the negative electrode material of any one of [1] to [7] as an active material.

[9] A method for selecting a negative electrode material for nonaqueous electrolyte secondary batteries, comprising the step of selecting from silicon composites structured such that microcrystals or microparticles of silicon are dispersed in a substance of a different composition from the microcrystals or microparticles, a silicon composite whose microcrystals or microparticles have a crystallite size of up to 8.0 nm as the negative electrode material.

Advantageous Effects of the Invention

According to the invention, there are available a negative electrode material for nonaqueous electrolyte secondary batteries and a nonaqueous electrolyte secondary battery, having an improved coulomb efficiency.

BRIEF DESCRIPTION OF THE DIAGRAMS

EMBODIMENT FOR CARRYING OUT THE INVENTION

Below the invention is described in detail.
[Silicon Composite]

The silicon composite of the invention is a silicon composite structured such that microcrystals or microparticles of silicon (sometimes abbreviated as silicon, hereinafter) are dispersed in a substance of a different composition from the microcrystals or microparticles, the microcrystals or microparticles having a crystallite size of up to 8.0 nm as determined by the Scherrer equation on the basis of the half width of a diffraction peak assigned to Si(220) on X-ray diffractometry. Preferably the silicon composite as a whole is a silicon oxide having the general formula: SiOx wherein x is 0.9≤x<1.6.

The microcrystals or microparticles have a crystallite size of up to 8.0 nm as determined by the Scherrer equation on the basis of the half width of a diffraction peak assigned to Si(220) and centering near 2θ=47.5° on X-ray diffractometry (Cu-Kα) using copper as the counter cathode, the crystallite size being preferably 1 to 8.0 nm, more preferably 1 nm to less than 8.0 nm, and even more preferably 1 to 7.5 nm. If silicon is completely amorphous and forms a perfect whole, it is so reactive that its properties may change during storage, or preparation of a slurry during electrode manufacture may become difficult. If the crystallite size is greater than 8.0 nm, silicon particles will include local regions not contributing to charge/discharge, resulting in a lowering of coulomb efficiency.

As used herein, the X-ray diffraction system (Cu-Kα) with a counter cathode of copper may be New D8 Advance of Bruker AXS, for example. The crystallite size may be determined by the Scherrer equation on the basis of the half width (exactly full width at half maximum or FWHM) of a diffraction peak. The half width is computed by using the XRD analysis software DIFFAC.EVA (Bruker AXS) or an analysis software having at least equivalent function and conducting appropriate background processing.

$$L=K\lambda/(\beta \cos \theta)$$

L: crystallite diameter
β: half width determined from a range from a peak value to approximately ±5° (/2θ).
  Peak value: 2θ(47.5°)
  Peak spread 2θ (measured half width—metallic Si half width 0.089° *)
    The metallic Si half width 0.089° varies with a particular XRD system.
    For measurement of metallic Si half width, crystalline Si free of crystal strain is used. A half width inherent to the XRD system is estimated therefrom. By subtracting the Si half width from the measured half width, a half width attributable to crystallite size can be determined.
λ: X-ray wavelength used (0.154 A)
K: Scherrer coefficient=0.9
θ: diffraction angle The substance of a different composition from the microcrystals or microparticles of silicon is preferably a silicon based compound, more preferably silicon dioxide.

When silicon oxide is mainly used as a starting material for the silicon composite, the amount of microcrystals or microparticles dispersed in the silicon/silicon dioxide dispersion is preferably about 2 to 36% by weight, more preferably about 10 to 30% by weight. If the amount of silicon dispersed is less than 2% by weight, the charge/discharge capacity may become low. If the amount of silicon dispersed exceeds 36% by weight, the cycle performance may become degraded.

When metallic silicon is used as a starting material for the silicon composite, the amount of microcrystals or microparticles dispersed in the composite is preferably 10 to 95% by weight, more preferably 20 to 90% by weight. If the dispersion amount is less than 10% by weight, the advantages of starting with metallic silicon may not be fully taken. If the dispersion amount exceeds 95% by weight, it may become difficult to keep silicon particles dispersed, sometimes resulting in a lowering of coulomb efficiency.

In a preferred embodiment, the silicon composite has on its surface a coating composed mainly of an electroconductive material, typically carbon. By coating particles of the silicon composite on their surface with a conductive material, the silicon composite is given a structure having an improved current collecting function. Since this prevents formation of particles not contributing to charge/discharge, a negative electrode material (for nonaqueous electrolyte secondary batteries) having a high coulomb efficiency during initial repeated charge/discharge cycles is available. Exemplary of the conductive material are metals and carbon. The conductive material is generally coated by physical vapor deposition (PVD) or chemical vapor deposition (CVD) although electroplating and carbon formation by heating organic matter for carbonization are also possible.

The silicon composite may be ground and sized as appropriate. The silicon composite particles have an average particle size of preferably at least 0.01 μm, more preferably at least 0.1 μm, even more preferably at least 0.2 μm, most preferably at least 0.3 μm, and preferably up to 30 μm, more preferably up to 20 μm, even more preferably up to 10 μm. Particles of a smaller average particle size have a lower bulk density, resulting in a lowering of charge/discharge capacity per unit volume. Particles of a larger average particle size make it difficult to form an electrode film, which will peel off from the current collector. As used herein, the average particle size is a value measured as weight average value $D_{50}$ (i.e., weight basis 50% cumulative diameter or median diameter) in particle size distribution measurement by the laser light diffraction method.

The silicon composite should preferably have a BET specific surface area of 0.1 to 30 $m^2/g$, more preferably 1 to 10 $m^2/g$. If the BET specific surface area is less than 0.1 $m^2/g$, the surface activity may become lower, the binding force of a binder during electrode preparation may become lower, resulting in a degradation of cycle performance after repeated charge/discharge cycles. If the BET specific surface area exceeds 30 $m^2/g$, a more amount of solvent may be absorbed during electrode preparation, which requires to add a larger amount of binder to maintain the binding force, resulting in a drop of conductivity as well as a degradation of cycle performance. As used herein, the BET specific surface area is a value measured in terms of $N_2$ gas adsorption amount by the BET single point method.

[Method of Preparing Silicon Composite]

Next, the method of preparing the silicon composite is described.

The silicon composite according to the invention may be prepared, for example, by heat treatment or the step of heat treating a silicon oxide having the general formula: SiOx wherein x is $0.9 \leq x < 1.6$ at a temperature of up to 1,100° C. in an inert gas or reducing atmosphere.

As used herein, the term "silicon oxide" generally refers to amorphous silicon oxides obtained by heating a mixture of silicon dioxide and metallic silicon to create silicon monoxide gas and cooling the gas for precipitation. The silicon oxide powder used herein is represented by the general formula: SiOx and has an average particle size of preferably at least 0.01 μm, more preferably at least 0.1 μm, even more preferably at least 0.3 μm, and preferably up to 30 μm, more preferably up to 20 μm, even more preferably up to 10 μm. The BET specific surface area is preferably at least 0.1 $m^2/g$, more preferably at least 0.2 $m^2/g$ and up to 30 $m^2/g$, more preferably up to 20 $m^2/g$. The range of x is $0.9 \leq x < 1.6$, preferably $1.0 \leq x \leq 1.3$, and more preferably $1.0 \leq x \leq 1.2$. If the average particle size and BET specific surface area of silicon oxide powder are outside the ranges, a silicon composite powder having the desired average particle size and BET specific surface area is not obtained. An SiOx powder wherein x has a value of less than 0.9 is difficult to form. An SiOx powder wherein x has a value of 1.6 or greater contains a larger proportion of inert $SiO_2$ formed during heat treatment, and when the same is applied to a lithium ion secondary cell, the charge/discharge capacity may become lower.

It is noted that the temperature of a precipitate plate on which particles are deposited by heating a mixture of silicon dioxide and metallic silicon to create silicon monoxide gas and cooling the gas for precipitation is managed at 1,050° C. or lower. If the precipitate plate locally exceeds 1,050° C., a variation of Si crystallite size may occur and formation of the desired silicon-containing material may be difficult, even when the following heat treatment conditions are maintained.

If the temperature of heat treatment of silicon oxide is higher than 1,100° C., silicon crystallites grow to a size of 10 nm or greater, leading to a lowering of coulomb efficiency. The heat treatment temperature is preferably up to 1,050° C., more preferably up to 1,000° C.

When a silicon oxide is formed by heating a mixture of silicon dioxide and metallic silicon to create silicon monoxide gas and cooling the gas for precipitation, the precipitation plate often reaches a temperature of 500° C. or higher, which means that the product is obtained substantially as heat treated at 500° C. or higher. It is thus regarded that the lower limit of heat treatment temperature is 500° C. in a substantial sense. The heat treatment time may be controlled as appropriate in the range of 10 minutes to about 20 hours, especially 30 minutes to about 12 hours, depending on the heat treatment temperature. For example, an appropriate time is about 5 hours at the treatment temperature of 1,100° C.

The heat treatment is not particularly limited while a reactor apparatus equipped with a heating means may be used in an inert gas atmosphere. The treatment may be performed continuously or batchwise. Depending on a particular purpose, a choice may be made among a fluidized bed reactor furnace, rotary furnace, vertical moving bed reactor furnace, tunnel furnace, batch furnace, and rotary kiln, for example. In this case, the treating gas may be a gas which is inert at the treatment temperature such as Ar, He, $H_2$ or $N_2$, alone or in admixture thereof.

As another method, microcrystals or microparticles may be obtained using metallic silicon as a starting material. For example, metallic silicon is heated and evaporated in vacuum and deposited on a cooling plate again. By quenching metallic silicon vapor in this way, microcrystals or microparticles of silicon are obtained. By adding silicon dioxide or alumina to the product, intensely grinding and milling the contents, a silicon composite structured such that microcrystals or microparticles of silicon are dispersed in a substance of a different composition from the microcrystals or microparticles may be prepared.

Described below is the method for preparing conductive silicon composite powder by forming a conductive coating on the silicon composite obtained as above. This method can also serve as the above-mentioned heat treatment when a silicon oxide powder is the starting material, contributing to a saving of manufacture cost. As long as the conductive silicon composite powder of the invention is constructed by coating powder particles with carbon, the powder particles being structured such that microcrystals or microparticles of silicon are dispersed in a substance of a different composition from the microcrystals or microparticles and preferably the microparticles of silicon have a crystallite size of up to 8 nm, the preparation method is not particularly limited. Preferably, a choice may be made among the following methods I to IV, for example.

Method I involves the steps of starting with a silicon composite powder structured such that microcrystals or microparticles of silicon are dispersed in a substance of a different composition from the microcrystals or microparticles (which is obtained by adding silicon dioxide or alumina to a silicon oxide powder represented by the general formula SiOx wherein $0.9 \leq x < 1.6$ or a metallic silicon powder consisting of microcrystals or microparticles of silicon, intensely grinding and milling the contents), and heat treating the silicon composite powder in an atmosphere containing at least an organic gas and/or vapor at a temperature in the range of 600 to 1,100° C., preferably 700 to 1,050° C., more preferably 700 to 1,000° C., and even more preferably 700 to 950° C., for thereby disproportionating the starting silicon oxide powder into a composite of silicon and silicon dioxide and achieving chemical vapor deposition on its surface.

Method II involves the steps of starting with a silicon composite powder structured such that microcrystals or microparticles of silicon are dispersed in a substance of a different composition from the microcrystals or microparticles (which is obtained by adding silicon dioxide or alumina to a silicon oxide powder represented by the general formula SiOx wherein 0.9≤x<1.6 or a metallic silicon powder consisting of microcrystals or microparticles of silicon, intensely grinding and milling the contents), preheating the silicon composite powder at 600 to 1,100° C. in an inert gas stream, and heat treating the preheated powder in an atmosphere containing at least an organic gas and/or vapor at a temperature in the range of 600 to 1,100° C., preferably 700 to 1,050° C., and more preferably 700 to 1,000° C., for thereby achieving chemical vapor deposition on particle surfaces.

Method III involves the steps of starting with a silicon composite powder structured such that microcrystals or microparticles of silicon are dispersed in a substance of a different composition from the microcrystals or microparticles (which is obtained by adding silicon dioxide or alumina to a silicon oxide powder represented by the general formula SiOx wherein 0.9≤x<1.6 or a metallic silicon powder consisting of microcrystals or microparticles of silicon, intensely grinding and milling the contents), heat treating the silicon composite powder in an atmosphere containing at least an organic gas and/or vapor at a temperature in the range of 500 to 1,100° C., preferably 500 to 1,050° C., and more preferably 500 to 900° C., for thereby achieving chemical vapor deposition of carbon, and effecting heat treatment in an inert gas atmosphere at a temperature in the range of 600 to 1,100° C., preferably 700 to 1,050° C., and more preferably 700 to 1,000° C.

Method IV involves the steps of starting with a silicon composite powder structured such that microcrystals or microparticles of silicon are dispersed in a substance of a different composition from the microcrystals or microparticles (which is obtained by adding silicon dioxide or alumina to a silicon oxide powder represented by the general formula SiOx wherein 0.9≤x<1.6 or a metallic silicon powder consisting of microcrystals or microparticles of silicon, intensely grinding and milling the contents), mixing the silicon composite powder with a carbon source such as sucrose, effecting carbonizing treatment at a temperature in the range of 500 to 1,100° C., preferably 500 to 1,050° C., and more preferably 500 to 900° C., and effecting heat treatment in an inert gas atmosphere at a temperature in the range of 600 to 1,100° C., preferably 800 to 1,050° C., and more preferably 800 to 1,000° C.

With respect to Method I or II involving chemical vapor deposition treatment at a temperature in the range of 600 to 1,100° C. (preferably 700 to 1,050° C., more preferably 700 to 1,000° C.), that is, thermal CVD treatment, if the heat treatment temperature is lower than 600° C., the fusion between conductive carbon coating and silicon composite and the ordering (crystallization) of carbon atoms may be insufficient, and if the temperature is higher than 1,100° C., the growth of microcrystals or microparticles of silicon may be promoted, both resulting in a lowering of coulomb efficiency.

On the other hand, with respect to Methods I to IV, it is expected that the quality of products is maintained consistent by controlling the crystallite size of silicon via heat treatment of silicon composite powder. If the heat treatment temperature is lower than 500° C., it may be difficult to control the crystallite size of silicon, which can induce a variation of battery properties as the negative electrode material. Inversely, if the heat treatment temperature is higher than 1,100° C., the growth of microcrystals or microparticles of silicon may be promoted, resulting in a lowering of coulomb efficiency.

It is noted that in Method III or IV wherein carbon coating of silicon composite powder is followed by heat treatment at 600 to 1,100° C., especially 800 to 1,000° C., even when the carbon coating step is at a treatment temperature in the range lower than 800° C., there is finally obtained the silicon composite to which a conductive carbon coating of ordered (or crystallized) carbon atoms is fused at the surface.

As mentioned above, a carbon coating is preferably formed by thermal CVD (CVD at or above 600° C.) or carbonization treatment while the treatment time may be selected as appropriate in consideration of the carbon amount. During the treatment, sometimes particles agglomerate together, and if so, the agglomerate is disintegrated in a ball mill or the like. In some cases, thermal CVD is similarly repeated.

It is noted that in Method I, the treatment temperature and time, the type of raw material for generating organic gas, and the concentration of organic gas must be selected as appropriate for the chemical vapor deposition and heat treatment to run forward. The heat treatment time is typically selected from the range of 0.5 to 12 hours, preferably 1 to 8 hours, and more preferably 2 to 6 hours.

Since the heat treatment time is correlated to the heat treatment temperature, for example, heat treatment is preferably carried out for at least 3 hours or at least 5 hours when the treatment temperature is 1,000° C.

It is noted that in Method II, the treatment time for the heat treatment in an atmosphere containing an organic gas and/or vapor (i.e., CVD treatment time) may typically be in the range of 0.5 to 12 hours, preferably 1 to 6 hours. When silicon oxide SiOx is previously heat treated, the treatment time may typically be in the range of 0.5 to 6 hours, preferably 0.5 to 3 hours.

Further, in Method III, the treatment time for the preheat treatment of silicon composite powder in an atmosphere containing an organic gas and/or vapor (i.e., CVD treatment time) may typically be in the range of 0.5 to 12 hours, preferably 1 to 6 hours, and the treatment time for the heat treatment in an inert gas atmosphere may typically be in the range of 0.5 to 6 hours, preferably 0.5 to 3 hours.

Further, in Method IV, the treatment time for the previous carbonizing treatment of silicon composite powder may typically be in the range of 0.5 to 12 hours, preferably 1 to 6 hours, and the time for the heat treatment in an inert gas atmosphere may typically be in the range of 0.5 to 6 hours, preferably 0.5 to 3 hours.

The organic matter used herein as the raw material for generating organic gas is selected from those compounds which are pyrolyzed at the heat treatment temperature, especially in a non-oxidative atmosphere, to generate carbon or graphite. Suitable compounds include aliphatic or alicyclic hydrocarbons such as methane, ethane, ethylene, acetylene, propane, butane, butene, pentane, isobutene, and hexane, alone or in admixture; and mono- to tricyclic aromatic hydrocarbons such as benzene, toluene, xylene, styrene, ethylbenzene, diphenylmethane, naphthalene, phenol, cresol, nitrobenzene, chlorobenzene, indene, coumarone, pyridine, anthracene, and phenanthrene, alone or in admixture. Also, gas oil, creosote oil, anthracene oil and naphtha cracking tar oil obtained from the tar distillation step may be used alone or in admixture. Also, as the carbon source used in the carbonizing treatment, a number of organic compounds are useful. Well-known examples include carbohydrates such as sucrose, hydrocarbons such as acrylonitrile and pitch, and derivatives thereof.

The aforementioned thermal CVD, heat treatment and carbonizing treatment are not particularly limited while a reactor apparatus equipped with a heating means may be used in a non-oxidative atmosphere. The treatment may be performed continuously or batchwise. Depending on a particular purpose, a choice may be made among a fluidized bed reactor furnace, rotary furnace, vertical moving bed reactor furnace, tunnel furnace, batch furnace, and rotary kiln, for example. In this case, the treating gas may be any of the aforementioned organic gases, alone or in admixture with a non-oxidative gas such as Ar, He, $H_2$ or $N_2$.

The reactor apparatus is preferably of the structure wherein a core tube of a rotary furnace or rotary kiln is extended horizontally and rotated about its axis. Since the silicon oxide powder is subjected to chemical vapor deposition while being tumbled, consistent treatment is possible without the risk of silicon oxide particles agglomerating together. The furnace tube is preferably rotated at a speed of 0.5 to 30 rpm, more preferably 1 to 10 rpm. The reactor apparatus is not particularly limited as long as it includes a furnace tube capable of holding an atmosphere, a rotating mechanism for rotating the furnace tube, and a heater mechanism for heating at elevated temperature and holding the temperature. Depending on a particular purpose, a stock feeding mechanism (e.g., feeder) and a product collecting mechanism (e.g., hopper) may be added, and the furnace tube may be inclined or provided with a buffle for controlling the residence time of the stock material. The material of which the furnace tube is made is not particularly limited, and any suitable one may be selected from among ceramics such as silicon carbide, alumina, mullite, and silicon nitride, refractory metals such as molybdenum and tungsten, stainless steel, and quartz, depending on treatment conditions and purpose.

The electroconductive coating may be formed more efficiently when the linear velocity u (m/sec) of fluidizing gas is selected such that its ratio to the minimum fluidization velocity $u_{mf}$ (i.e, $u/u_{mf}$) may fall in the range: $1.5 \le u/u_{mf} \le 5$. If $u/u_{mf} < 1.5$, insufficient fluidization may result in variant conductive coatings. If $u/u_{mf} > 5$, secondary agglomeration of particles may occur, failing to form a uniform conductive coating. It is noted that the minimum fluidization velocity is dependent on the size of particles, treatment temperature, treatment atmosphere, and the like. The minimum fluidization velocity $u_{mf}$ is defined, in a test of gradually increasing the linear velocity of fluidizing gas, as the linear velocity of fluidizing gas when the pressure loss across the powder is equal to W/A wherein W is the weight of the powder and A is the cross-sectional area of the fluidized bed. Notably, the value of $u_{mf}$ is typically 0.1 to 30 cm/sec, preferably 0.5 to 10 cm/sec. The particle size providing a value of $u_{mf}$ in the range is typically 0.5 to 100 µm, preferably 5 to 50 µm. Particles with a size of less than 0.5 µm may undergo secondary agglomeration, failing in effective treatment of surfaces of individual particles.

In a preferred embodiment, the silicon composite further contains lithium. For example, the resulting silicon composite particles or conductive silicon composite particles may be doped with lithium, thereby obtaining a negative electrode active material which is reduced in degradation of initial capacity efficiency or degradation of capacity during initial charge/discharge cycles (a percent lowering of initial capacity).

Exemplary lithium predoping methods include a method of mixing the silicon composite powder or conductive silicon composite powder with lithium hydride, lithium aluminum hydride, or lithium alloy and effecting heat treatment, and a method of milling and mixing the silicon composite powder or conductive silicon composite powder with metallic lithium in the presence of a solvent, and effecting heat treatment to form lithium silicate, for thereby predoping the powder with lithium.

In the embodiment wherein the powder is milled and mixed with metallic lithium in the presence of a solvent, the solvent may be selected from carbonates (e.g., dibutyl carbonate), lactones, sulfolanes, ethers, hydrocarbons, and mixtures thereof, which are not reactive with metallic lithium and lithium-doped material. The use of such a solvent is more effective for preventing the influence of decomposition or the like during charge/discharge of a power storage device (e.g., battery or capacitor) which is manufactured using the resultant lithium-doped negative electrode material.

Also useful is a solvent which is not reactive with metallic lithium and lithium-doped material and has a boiling point of at least 65° C. The solvent having a boiling point of at least 65° C. is more effective for mitigating the difficulty of uniform mixing of metallic lithium during the milling/mixing step due to evaporation of the solvent.

The content of lithium incorporated or doped is preferably less than 10% by weight, more preferably 2 to 8% by weight based on the silicon composite powder. Even when the lithium content is at least 10% by weight based on the silicon composite powder, the crystallite size may be controlled to or below 8 nm, for example, by adjusting the temperature of heat treatment after lithium mixing, specifically below 400° C., preferably at 200 to 380° C.

The milling/mixing step may be performed using a circumferential speed spin mill.

Alternatively, the milling/mixing step may include milling and mixing metallic lithium having a thickness of at least 0.1 mm in the presence of a solvent, and subsequently milling and mixing on a circumferential speed spin mill.

The use of a circumferential speed spin mill ensures efficient milling and mixing. The use of metallic lithium having a thickness of at least 0.1 mm is preferred in consideration of a lithium predoping rate and productivity.

The above heat treatment may be performed at a temperature of 200 to 1,100° C. A temperature of at least 200° C. is preferred for an efficient chemical change of active lithium to stable lithium silicate whereas a temperature of up to 1,100° C. is more effective for preventing a degradation of coulomb efficiency due to the growth of Si crystals.

According to the invention, the silicon composite powder or conductive silicon composite powder may be used as a negative electrode material, specifically a negative electrode active material to construct a nonaqueous electrolyte secondary cell having a high capacity and improved cycle performance, especially a lithium ion secondary cell.

The lithium ion secondary cell thus constructed is characterized by the use of the negative electrode active material while the materials of the positive electrode, negative electrode, electrolyte, and separator and the cell design are not critical. For example, the positive electrode active material used herein may be selected from oxides and chalcogenides of transition metals such as $LiCoO_2$, $LiNiO_2$, $LiMn_2O$, $V_2O$, $MnO_2$, $TiS_2$ and $MoS_2$. The electrolytes used herein may be lithium salts such as lithium perchlorate in nonaqueous solution form. Examples of the nonaqueous solvent include propylene carbonate, ethylene carbonate, dimethoxyethane, γ-butyrolactone and 2-methyltetrahydrofuran, alone or in admixture. Use may also be made of other various nonaqueous electrolytes and solid electrolytes.

When a negative electrode is prepared using the conductive silicon composite powder, a conductive agent such as graphite may be added to the powder. The type of conductive agent used herein is not critical as long as it is an electronically conductive material which does not undergo decomposition or alteration in the cell. Illustrative conductive agents include metals in powder or fiber form such as Al, Ti, Fe, Ni, Cu, Zn, Ag, Sn and Si, natural graphite, synthetic graphite, various coke powders, meso-phase carbon, vapor phase grown carbon fibers, pitch base carbon fibers, PAN base carbon fibers, and graphite obtained by firing various resins. It is noted that the desired effects of the invention are obtained whether or not the silicon composite powder contains less than 1% by weight of Si metal powder.

When the conductive silicon composite powder is mixed with the conductive agent, the amount of conductive agent added is preferably 1 to 60% by weight, more preferably 10 to 50% by weight, even more preferably 20 to 50% by weight of the mixture. A mixture with less than 1% by weight of the conductive agent may fail to withstand expansion and contraction on charge/discharge cycles, whereas a mixture with more than 60% by weight of the conductive agent may have a reduced charge/discharge capacity. Also the mixture should preferably have a total carbon content of 25 to 90% by weight, especially 30 to 50% by weight (i.e., total of the amount of carbon coated or deposited on surfaces of conductive silicon composite particles and the carbon content in the conductive agent). A mixture with a total carbon content of less than 25% by weight may fail to withstand expansion and contraction on charge/discharge cycles, whereas a mixture with more than 90% by weight of carbon may lead to a reduced charge/discharge capacity.

The negative electrode may be prepared, for example, as a shaped body by the following method. The silicon composite and optional additives such as a conductive agent and binder are kneaded in a solvent such as N-methylpyrrolidone or water to form a paste mix, which is applied to a sheet as a current collector. The current collector used herein may be of any materials commonly used as the negative electrode current collector such as copper and nickel foils while it is not particularly limited in thickness and surface treatment. The technique of shaping the mix into a sheet is not particularly limited and any well-known techniques may be used.

EXAMPLES

Examples and Comparative Examples are given below for illustrating the invention, but the invention is not limited thereto. Unless otherwise stated, percent (%) of composition are by weight.

Example 1: Sample Nos. 1 to 3

Figure 1:
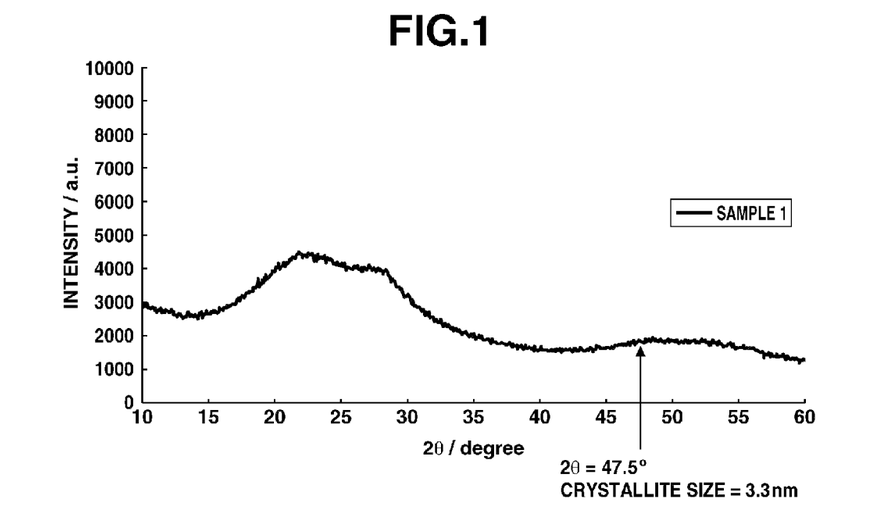
FIG. 1 is an X-ray diffraction chart of Sample 1 using Cu-Kα ray.

A tray of silicon nitride was charged with 200 g of a silicon oxide powder of SiOx wherein x=1.02 having an average particle size of 3 μm and a BET specific surface area of 12 m$^2$/g before it was rested in a furnace capable of holding the atmosphere. Argon gas was fed into the furnace whereby the furnace interior was purged with argon. While argon gas was fed at 2 NL/min, the furnace was heated at a ramp rate of 300° C./hr and held at a temperature of 600 to 1,000° C. for 3 to 10 hours. At the end of holding, cooling was started. After room temperature was reached, the powder was recovered. On analysis by x-ray diffractometry using Cu-Kα ray, the products were silicon composite powders of the following three types in which silicon crystallites dispersed in silicon dioxide had a size of 3.3 to 4.1 nm as determined by the Scherrer equation on the basis of the half width of a diffraction peak of diffraction curve assigned to Si(220) and centering near 2θ=47.5°. FIG. 1 is a chart of X-ray diffraction with Cu-Kα ray for Sample 1.

[Cell Test]

Using the silicon composite powder obtained above, a cell was constructed and evaluated by the following test.

First 75% of the silicon composite was mixed with 5% of acetylene black, 5% of carbon nanotube, and 15% of polyimide in N-methylpyrrolidone as dispersing medium to form a slurry. The slurry was coated onto a copper foil of 15 μm thick. The coated sheet was previously vacuum dried at 85° C. for 30 minutes, shaped under pressure by means of a roller press, and vacuum dried again at 400° C. for 2 hours, after which pieces of 2 cm$^2$ were punched out as the negative electrode.

Next, a positive electrode was prepared under the following conditions, using lithium cobaltate as positive electrode active material.

First, 95% of lithium cobaltate was mixed with 1.5% of acetylene black, 1% of carbon nanotube, and 2.5% of polyvinylidene fluoride in N-methylpyrrolidone as dispersing medium to form a slurry. The slurry was coated onto an aluminum foil of 15 μm thick. The coated sheet was previously dried in air at 85° C. for 10 minutes, shaped under pressure by means of a roller press, and vacuum dried at 130° C. for 5 hours, after which pieces of 2 cm$^2$ were punched out as the positive electrode. A test lithium ion secondary cell was constructed using the negative and positive electrodes. The electrolyte solution used was a nonaqueous electrolyte solution of lithium hexafluorophosphate in a 1/1 (by volume) mixture of ethylene carbonate and 1,2-dimethoxyethane in a concentration of 1 mol/liter. The separator used was a microporous polyethylene film of 30 μm thick.

The lithium ion secondary cell thus constructed was allowed to stand overnight at room temperature before it was tested by a secondary cell charge/discharge tester (Nagano K.K.). Charging was conducted with a constant current flow of 2.5 mA until the voltage of the test cell reached 4.2 V, and after reaching 4.2 V, continued with a reduced current flow so that the cell voltage was kept at 4.2 V, and terminated when the current flow decreased below 0.5 mA. Discharging was conducted with a constant current flow of 2.5 mA and terminated when the cell voltage dropped below 2.5 V, from which a discharge capacity was determined.

By repeating the above operation, the charge/discharge test was carried out more than 20 cycles on the test lithium ion secondary cell.

On every charge/discharge cycle, coulomb efficiency was determined according to the equation.

Coulomb efficiency(%)=(discharge current quantity)/(charge current quantity)×100

Figure 2:
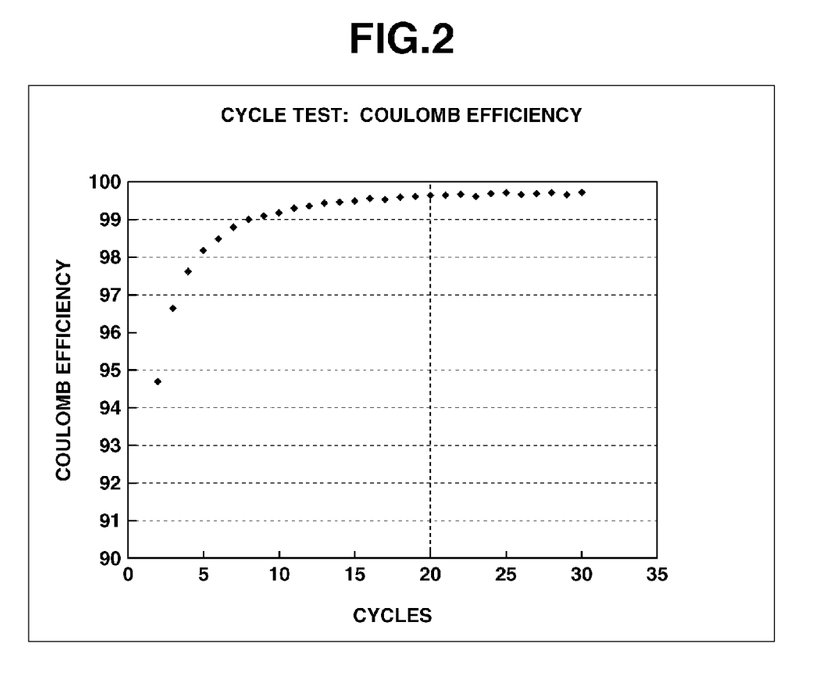
FIG. 2 is a graph showing coulomb efficiency versus charge/discharge cycles.
Figure 3:
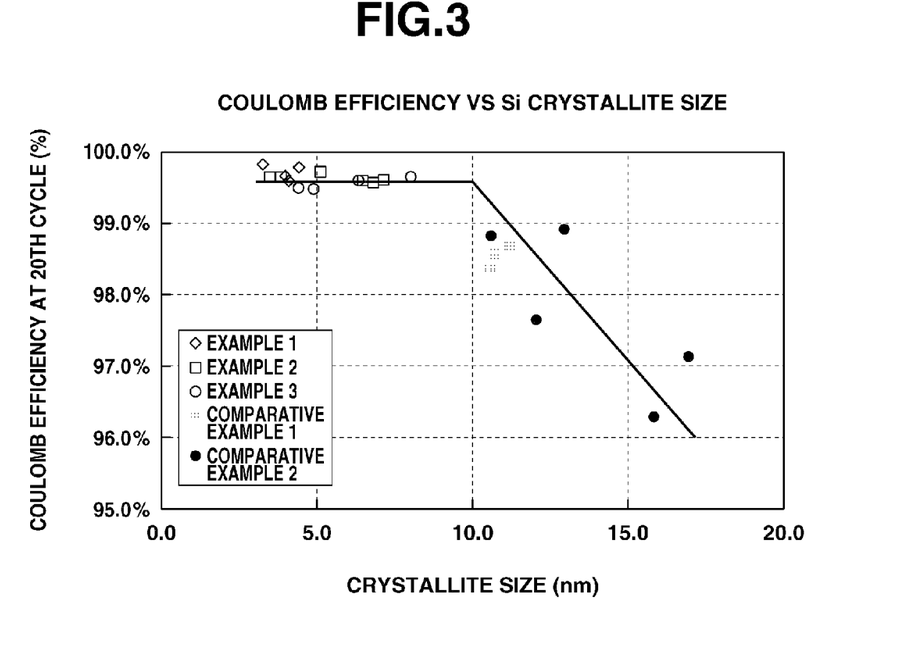
FIG. 3 is a graph showing the coulomb efficiency at 20th cycle versus Si crystallite size.

In the graph of FIG. 2, the coulomb efficiency is plotted versus charge/discharge cycles. There is a tendency that the coulomb efficiency is low at the start of charge/discharge operation, but becomes steady after repetition of about 20 charge/discharge cycles. When the cell is used on an automobile in practice, characteristics in the steady state are more important than the initial characteristics. Thus the value at the 20th cycle where the coulomb efficiency becomes steady is used for evaluation. The results are shown in Table 1. FIG. 3 is a graph showing the coulomb efficiency at 20th cycle versus Si crystallite size.

As to the initial charge capacity, a lowering of capacity during charge/discharge cycles is evaluated as a percent lowering of initial capacity. Specifically, a percent lowering of initial capacity is computed from the charge capacities of the 1st and 20th cycles by the following equation.

Lowering of initial capacity(%)=[1−(20th cycle charge capacity)/(1st cycle charge capacity)]× 100

Figure 4:
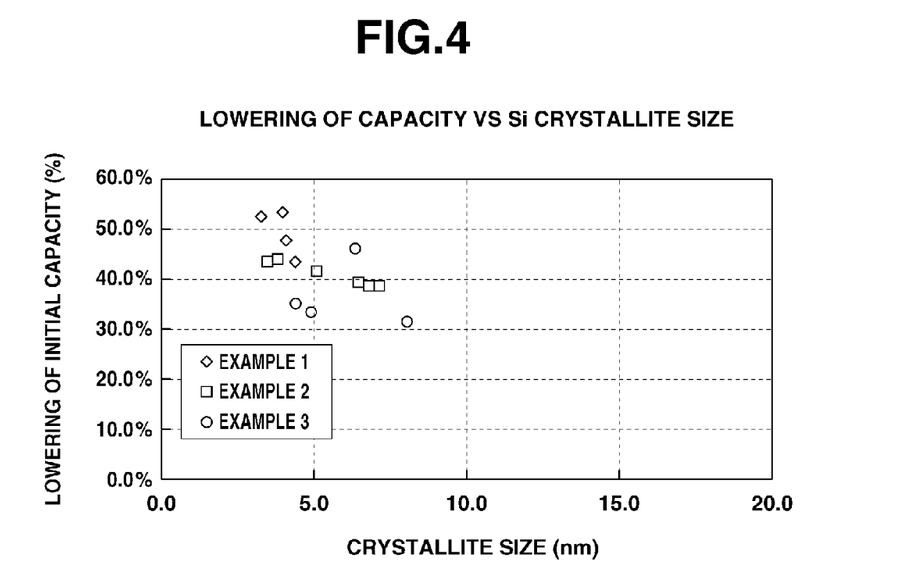
FIG. 4 is a graph showing a percent lowering of initial capacity versus Si crystallite size.

FIG. 4 is a graph showing a percent lowering of initial capacity versus Si crystallite size.

TABLE 1

| Sample No. | Holding temperature (° C.) | Si crystallite size (nm) | Coulomb efficiency (%) | Lowering of initial capacity (%) |
|---|---|---|---|---|
| 1 | 600 | 3.3 | 99.8 | 52.2 |
| 2 | 900 | 4.0 | 99.7 | 53.2 |
| 3 | 1,000 | 4.1 | 99.6 | 47.5 |

Example 2: Sample Nos. 4 to 9, CVD

A tray of silicon nitride was charged with 200 g of a silicon oxide powder of SiOx wherein x=1.02 having an average particle size of 3 μm and a BET specific surface area of 12 m²/g before it was rested in a furnace capable of holding the atmosphere. Argon gas was fed into the furnace whereby the furnace interior was purged with argon. While a methane/argon gas mixture was fed at 2 NL/min, the furnace was heated at a ramp rate of 300° C./hr and held at a temperature of 600 to 1,100° C. for 3 to 10 hours to carry out thermal CVD of carbon coating. At the end of holding, cooling was started. After room temperature was reached, the powder was recovered. The conductive silicon composite powder thus obtained had a deposited carbon content of 5.3 to 18.5% by weight. On analysis by x-ray diffractometry using Cu-Kα ray, silicon crystallites dispersed in silicon dioxide had a size of 3.5 to 7.1 nm as determined by the Scherrer equation on the basis of the half width of a diffraction peak of diffraction curve assigned to Si(220) and centering near 2θ=47.5°.

[Cell Test]

Using the conductive silicon composite powder obtained above, a cell was constructed and tested as in Example 1. The coulomb efficiency at the 20th cycle was determined to be as high as 99.6 to 99.7%. The results are shown in Table 2. Like Example 1, the coulomb efficiency at 20th cycle is plotted relative to Si crystallite size in the graph of FIG. 3. A percent lowering of initial capacity was determined as in Example 1. The percent lowering of initial capacity is plotted relative to Si crystallite size in the graph of FIG. 4.

TABLE 2

| Sample No. | Holding temperature (° C.) | Si crystallite size (nm) | Coulomb efficiency (%) | Lowering of initial capacity (%) |
|---|---|---|---|---|
| 4 | 1,100 | 7.1 | 99.6 | 38.7 |
| 5 | 900 | 3.5 | 99.6 | 43.3 |
| 6 | 1,100 | 6.5 | 99.6 | 39.2 |
| 7 | 1,000 | 5.1 | 99.7 | 41.4 |
| 8 | 1,050 | 3.8 | 99.6 | 43.7 |
| 9 | 1,100 | 6.8 | 99.6 | 38.6 |

Example 3: Sample Nos. 10 to 13, Lithium Doping

The silicon composite powder of Example 1 and the conductive silicon composite powder of Example 2 were obtained by starting with silicon oxide powder and effecting heat treatment and carbon deposition. It was now examined whether or not the relation of the half width of silicon to coulomb efficiency held even when another element was introduced. A conductive silicon composite powder which was pre-doped with lithium (which is believed effective to improve 1st cycle efficiency) was prepared before a cell was constructed. Specifically, the conductive silicon composite powder of Example 2 wherein silicon crystallites had a size of 3.5 nm was milled and mixed with 5% of metallic lithium in dimethyl carbonate (DMC), followed by drying. The thus lithium-doped conductive silicon composite powder was heated in an argon gas atmosphere at a ramp rate of 300° C./hr and held at a temperature of 500 to 800° C. for 3 to 8 hours.

On analysis of the lithium-doped conductive silicon composite powder by x-ray diffractometry using Cu-Kα ray, silicon crystallites had a size of 4.4 to 8.0 nm as determined by the Scherrer equation on the basis of the half width of a diffraction peak of diffraction curve assigned to Si(220) and centering near 2θ=47.5°.

[Cell Test]

Using the conductive silicon composite powder obtained above, a cell was constructed and tested as in Example 1. The coulomb efficiency at the 20th cycle was determined to be as high as 99.5 to 99.6%. The results are shown in Table 3. Like Example 1, the coulomb efficiency at 20th cycle is plotted relative to silicon crystallite size in the graph of FIG. 3. A percent lowering of initial capacity was determined as in Example 1. The percent lowering of initial capacity is plotted relative to silicon crystallite size in the graph of FIG. 4.

TABLE 3

| Sample No. | Holding temperature (° C.) | Si crystallite size (nm) | Coulomb efficiency (%) | Lowering of initial capacity (%) |
|---|---|---|---|---|
| 10 | 500 | 4.4 | 99.5 | 35.1 |
| 11 | 600 | 4.9 | 99.5 | 33.2 |
| 12 | 800 | 8.0 | 99.6 | 31.5 |
| 13 | 700 | 6.3 | 99.6 | 45.9 |

Comparative Example 1: Sample Nos. 14 to 16

A tray of silicon nitride was charged with 200 g of a silicon oxide powder of SiOx wherein x=1.02 having an average particle size of 3 μm and a BET specific surface area of 12 m²/g before it was rested in a furnace capable of holding the atmosphere. Argon gas was fed into the furnace whereby the furnace interior was purged with argon. While a methane/argon gas mixture was fed at 2 NL/min, the furnace was heated at a ramp rate of 300° C./hr and held at a temperature of 1,300° C. for 2 to 3 hours to carry out thermal CVD. At the end of holding, cooling was started. After room temperature was reached, the powder was recovered. The conductive silicon composite powder thus obtained had a deposited carbon content of 15.0 to 18.5%. On analysis by x-ray diffractometry using Cu-Kα ray, silicon crystallites dispersed in silicon dioxide had a size of 10.6 to 11.2 nm as determined by the Scherrer equation on the basis of the half width of a diffraction peak of diffraction curve assigned to Si(220) and centering near 2θ=47.5°.

[Cell Test]

Using the conductive silicon composite powder obtained above, a cell was constructed and tested as in Example 1. The coulomb efficiency at the 20th cycle was determined to be 98.4 to 98.7%, which values were about one point lower than in Examples. The results are shown in Table 4. Like Example 1, the coulomb efficiency at 20th cycle is plotted relative to silicon crystallite size in the graph of FIG. 3.

TABLE 4

| Sample No. | Holding temperature (° C.) | Si crystallite size (nm) | Coulomb efficiency (%) | Lowering of initial capacity (%) |
|---|---|---|---|---|
| 14 | 1,300 | 10.8 | 98.6 | — |
| 15 | 1,300 | 11.2 | 98.7 | — |
| 16 | 1,300 | 10.6 | 98.4 | — |

Comparative Example 2: Sample Nos. 17 to 21

The conductive silicon composite powder of Example 2 wherein silicon crystallites had a size of 3.5 nm was milled and mixed with 10% of metallic lithium in an organic solvent, followed by drying. The thus lithium-doped conductive silicon composite powder was heated in an argon gas atmosphere at a ramp rate of 300° C./hr and held at a temperature of 400 to 800° C. for 2 to 12 hours.

On analysis of the lithium-doped conductive silicon composite powder by x-ray diffractometry using Cu-Kα ray, silicon crystallites had a size of 10.6 to 17.0 nm as determined by the Scherrer equation on the basis of the half width of a diffraction peak of diffraction curve assigned to Si(220) and centering near 2θ=47.5°. Under the above conditions including an anneal temperature which was comparable to Example 3 or lower, silicon crystallites grew to a greater size probably because the amount of lithium doped was more than the amount (Li=5%) in Example 3.

[Cell Test]

Using the conductive silicon composite powder obtained above, a cell was constructed and tested as in Example 1. The coulomb efficiency at the 20th cycle was determined to be 96.3 to 98.9%, which values were at least one point lower than in Examples. The results are shown in Table 5. Like Example 1, the coulomb efficiency at 20th cycle is plotted relative to silicon crystallite size in the graph of FIG. 3.

TABLE 5

| Sample No. | Holding temperature (° C.) | Si crystallite size (nm) | Coulomb efficiency (%) | Lowering of initial capacity (%) |
|---|---|---|---|---|
| 17 | 800 | 17.0 | 97.1 | — |
| 18 | 600 | 10.6 | 98.8 | — |
| 19 | 450 | 13.0 | 98.9 | — |
| 20 | 400 | 15.8 | 96.3 | — |
| 21 | 800 | 12.1 | 97.6 | — |

[Review of Effects in Figure]

As is evident from the data of FIG. 3, the coulomb efficiency depends on the size of silicon crystallites in the silicon composite, and a definite favorable region where the crystallite size is 8 nm or less is recognizable. These results indicate that a negative electrode material or a nonaqueous electrolyte secondary battery, having a satisfactory coulomb efficiency is obtained, independent of the composition of silicon composite and the presence or absence of a conductive coating, as long as the crystallite size is properly controlled.

Examples 2 and 3 provide a negative electrode material or a nonaqueous electrolyte secondary battery, having a reduced percent lowering of initial capacity and high performance as compared with Example 1. It is believed that the benefits of Example 2 are attributable to deposition of carbon coating and the benefits of Example 3 are attributable to deposition of carbon coating and lithium doping.

The invention claimed is:

1. A method of preparation for the negative electrode material for nonaqueous electrolyte secondary batteries comprising a lithium-containing silicon composite, wherein
   the lithium-containing silicon composite is silicon composite doped with lithium, and
   the silicon composite is structured such that microcrystals or microparticles of silicon are dispersed in a substance of a different composition from the microcrystals or microparticles, the microcrystals or microparticles having a crystallite size of up to 8.0 nm as determined by the Scherrer equation on the basis of the half width of a diffraction peak assigned to Si(220) on X-ray diffractometry,
   the silicon composite is a silicon oxide having the general formula: SiOx wherein x is 0.9≤x<1.6, and
   the content of lithium is 2 to 8% by weight based on the silicon composite,
   the method comprising a step of doping the silicon composite with lithium by milling and mixing the silicon composite powder or conductive silicon composite powder with metallic lithium in the presence of a solvent, and heating effecting treatment.

* * * * *